(12) United States Patent
Sun

(10) Patent No.: US 9,585,117 B2
(45) Date of Patent: Feb. 28, 2017

(54) METHOD AND SYSTEM FOR PROMPT OF SIGNAL COVERAGE HOLE IN ADVANCE

(71) Applicant: ZTE CORPORATION, Shenzhen, Guangdong Province (CN)

(72) Inventor: Gengmao Sun, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 9 days.

(21) Appl. No.: 14/436,630

(22) PCT Filed: Aug. 8, 2013

(86) PCT No.: PCT/CN2013/081040
§ 371 (c)(1),
(2) Date: Apr. 17, 2015

(87) PCT Pub. No.: WO2013/185728
PCT Pub. Date: Dec. 19, 2013

(65) Prior Publication Data
US 2016/0174183 A1 Jun. 16, 2016

(30) Foreign Application Priority Data

Oct. 18, 2012 (CN) .......................... 2012 1 0397400

(51) Int. Cl.
H04W 24/04 (2009.01)
H04W 64/00 (2009.01)
H04W 4/02 (2009.01)

(52) U.S. Cl.
CPC .......... H04W 64/00 (2013.01); H04W 4/023 (2013.01); H04W 24/04 (2013.01)

(58) Field of Classification Search
None
See application file for complete search history.

(56) References Cited

U.S. PATENT DOCUMENTS

| 6,597,906 | B1 | 7/2003 | Van Leeuwen et al. |
| 7,076,245 | B1* | 7/2006 | Satapathy ............. H04W 24/08 370/241 |
| 2001/0016489 | A1* | 8/2001 | Haymes ................ H04W 24/00 455/423 |
| 2003/0061009 | A1* | 3/2003 | Davis .................... H04W 16/18 702/189 |

(Continued)

FOREIGN PATENT DOCUMENTS

| CN | 1435066 A | 8/2003 |
| CN | 1708173 A | 12/2005 |

(Continued)

Primary Examiner — Daniel Lai
(74) Attorney, Agent, or Firm — Ling Wu; Stephen Yang; Ling and Yang Intellectual Property

(57) ABSTRACT

A method and system for prompting a signal blind area in advance are applied to a mobile terminal. The method includes: locating the mobile terminal, and acquiring current location information of the mobile terminal; determining distances between a current location of the mobile terminal and locations of various blind area boundary points recorded in a blind area list; and when one or more of the distances are less than or equal to a preset first blind area distance threshold, sending a prompt of approaching the signal blind area to a user.

12 Claims, 1 Drawing Sheet

(56) References Cited

U.S. PATENT DOCUMENTS

| | | | |
|---|---|---|---|
| 2004/0203607 A1 | 10/2004 | Satapathy | |
| 2010/0183134 A1* | 7/2010 | Vendrow | H04M 3/42348 379/201.06 |
| 2012/0157164 A1* | 6/2012 | Locker | H04W 4/025 455/564 |

FOREIGN PATENT DOCUMENTS

| | | |
|---|---|---|
| CN | 101394234 A | 3/2009 |
| CN | 101521901 A | 9/2009 |
| JP | 2003517799 A | 5/2003 |
| JP | 2007081941 A | 3/2007 |

\* cited by examiner

METHOD AND SYSTEM FOR PROMPT OF SIGNAL COVERAGE HOLE IN ADVANCE

TECHNICAL FIELD

The present document relates to the field of mobile communication technology, and particularly, to a method and system for prompting a signal blind area in advance.

BACKGROUND OF THE RELATED ART

With the rapid development of the mobile communication technology, mobile terminal devices represented by mobile phones bring great convenience to people's lives, and all these are based on good network coverage. However, according to characteristics of the mobile network itself, the mobile network is hard to cover all corners to which the mobile terminal may move, such as, mountainous areas, at sea, underground garages and high-rise included angles and so on. All these coverage dead angles bring much inconvenience to the use of the mobile terminal and also influence the user experience greatly. In order to make up the inconvenience which coverage blind areas and dead angles of the wireless network bring to the users, loss resulted from no signal to the users can be reduced through certain advance prompts, which improves the user experience.

In the related art, after there have been no signal in the mobile terminal, that is, it has already entered the network coverage blind area, a no-signal prompt is given to the user, and the user may feel that the no-signal prompt of the mobile terminal is too late. Therefore, a new technical scheme is required, before the mobile terminal enters the network coverage blind area, a relevant warning prompt is given to the user, so as to improve the user experience of the mobile terminal.

SUMMARY OF THE INVENTION

The embodiments of the present invention provide a method and system for prompting a signal blind area in advance, which can prompt a user of entering a blind area in advance before a mobile terminal enters the network coverage blind area, thereby improving the user experience.

The embodiment of the present invention provides a method for prompting a signal blind area in advance, which is applied to a mobile terminal, and comprises:

locating the mobile terminal, and acquiring current location information of the mobile terminal;

determining distances between a current location of the mobile terminal and locations of various blind area boundary points recorded in a blind area list; and when one or more of the distances are less than or equal to a preset first blind area distance threshold, sending a prompt of approaching the signal blind area to a user.

Alternatively, the method further comprises: adding blind area boundary point location information in the blind area list; wherein the step of adding blind area boundary point location information in the blind area list comprises:

detecting whether the intensity of a wireless signal received by the mobile terminal hops from greater than or equal to a preset blind area signal intensity threshold to less than the preset blind area signal intensity threshold, if the intensity of wireless signal received by the mobile terminal hops from greater than or equal to the preset blind area signal intensity threshold to less than the preset blind area signal intensity threshold, locating the mobile terminal and acquiring the current location information of the mobile terminal; and judging whether a location information record which is same as or similar to the current location information of the mobile terminal exists in the blind area list, and if the location information record which is same as or similar to the current location information of the mobile terminal does not exist in the blind area list, taking the current location information of the mobile terminal as new blind area boundary point location information to be stored in the blind area list; wherein the similarity or sameness of two location information refers to that: a distance between locations corresponding to the two location information is less than or equal to a distance distinction threshold.

Alternatively, the method further comprises: deleting the blind area boundary point location information from the blind area list; wherein the step of deleting the blind area boundary point location information from the blind area list comprises:

when detecting that the intensity of wireless signal currently received by the mobile terminal is greater than or equal to the preset blind area signal intensity threshold, and distances between the current location of the mobile terminal and locations of one or more blind area boundary points recorded in the blind area list are less than or equal to a preset second blind area distance threshold, deleting records of blind area boundary points with distances between the blind area boundary points and the current location of the mobile terminal being less than or equal to the preset second blind area distance threshold from the blind area list;

wherein the second blind area distance threshold is less than the first blind area distance threshold.

Alternatively, the method further comprises:

before locating the mobile terminal and acquiring the current location information of the mobile terminal, judging whether a signal blind area advance prompt function is enabled in the mobile terminal, if the signal blind area advance prompt function is enabled, locating the mobile terminal, and acquiring the current location information of the mobile terminal.

Alternatively, the current location information of the mobile terminal comprises: latitude and longitude coordinates in which the mobile terminal is located.

The embodiment of the present invention further provides a system for prompting a signal blind area in advance, which is applied to a mobile terminal, and comprises:

a positioning module, configured to: locate the mobile terminal and acquire current location information of the mobile terminal;

a distance calculation module, configured to: determine distances between a current location of the mobile terminal and locations of various blind area boundary points recorded in a blind area list; and a blind area judgment and prompt module, configured to: when one or more of the distances are less than or equal to a preset first blind area distance threshold, send a prompt of approaching the signal blind area to a user.

Alternatively, the system further comprises a blind area information addition module, wherein:

the blind area information addition module is configured to: add blind area boundary point location information in the blind area list;

the blind area information addition module comprises: a detection unit and an information addition unit;

the detection unit is configured to: detect whether the intensity of a wireless signal received by the mobile terminal hops from greater than or equal to a preset blind area signal intensity threshold to less than the preset blind area signal intensity threshold, if the wireless signal intensity received by the mobile terminal hops from greater than or equal to the preset blind area signal intensity threshold to less than the preset blind area signal intensity threshold, locate the mobile terminal and acquire the current location information of the mobile terminal, and start the information addition unit; and the information addition unit is configured to: judge whether a location information record which is same as or similar to the current location information of the mobile terminal exists in the blind area list, and if the location information record which is same as or similar to the current location information of the mobile terminal does not exist in the blind area list, take the current location information of the mobile terminal as new blind area boundary point location information to be stored in the blind area list; wherein similarity or sameness of two location information refers to that: a distance between locations corresponding to the two location information is less than or equal to a distance distinction threshold.

Alternatively, the system further comprises a blind area information deletion module, wherein:

the blind area information deletion module is configured to: delete the blind area boundary point location information from the blind area list;

the blind area information deletion module comprises: a detection unit and an information deletion unit;

the detection unit is configured to: when detecting that the intensity of a wireless signal currently received by the mobile terminal is greater than or equal to the preset blind area signal intensity threshold, and distances between the current location of the mobile terminal and locations of one or more blind area boundary points recorded in the blind area list are less than or equal to a preset second blind area distance threshold, start the information deletion unit; and the information deletion unit is configured to: delete records of blind area boundary points with distances between the blind area boundary points and the current location of the mobile terminal being less than or equal to the preset second blind area distance threshold from the blind area list;

wherein the second blind area distance threshold is less than the first blind area distance threshold.

Alternatively, the positioning module is further configured to: before locating the mobile terminal and acquiring the current location information of the mobile terminal, judge whether a signal blind area advance prompt function is enabled in the mobile terminal, if the signal blind area advance prompt function is enabled, locate the mobile terminal and acquire the current location information of the mobile terminal.

Alternatively, the current location information of the mobile terminal comprises: latitude and longitude coordinates in which the mobile terminal is located.

In the embodiments of the present invention, it can prompt the user in advance that the mobile terminal is to enter the blind area before the mobile terminal enters the network coverage blind area, which improves the user experience.

PREFERRED EMBODIMENTS OF THE INVENTION

The embodiments of the present invention will be described in detail below in combination with the accompanying drawings. It should be noted that the embodiments in the present invention and the characteristics in the embodiments can be optionally combined with each other in the condition of no conflict.

Figure 1:
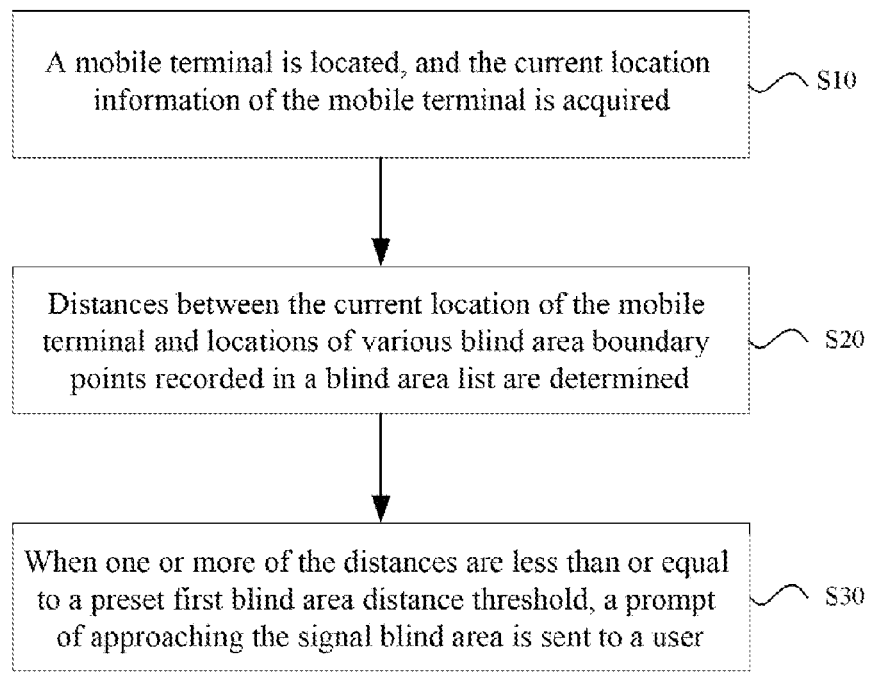
FIG. 1 is a flow chart of a method for prompting a signal blind area in advance according to the embodiment of the present invention.

As shown in FIG. 1, the embodiment of the present invention provides a method for prompting a signal blind area in advance, which is applied to a mobile terminal. The method includes the following steps.

In step S10, the mobile terminal is located, and the current location information of the mobile terminal is acquired.

In step S20, distances between the current location of the mobile terminal and locations of various blind area boundary points recorded in a blind area list are determined.

In step S30, when one or more of the distances are less than or equal to a preset first blind area distance threshold, a prompt of approaching the signal blind area is sent to a user.

The method includes the following characteristics:

the method also includes: adding blind area boundary point location information in the blind area list;

the step of adding blind area boundary point location information in the blind area list includes:

detecting whether the intensity of a wireless signal received by the mobile terminal hops from greater than or equal to a preset blind area signal intensity threshold to less than the preset blind area signal intensity threshold, if the intensity of wireless signal received by the mobile terminal hops from greater than or equal to the preset blind area signal intensity threshold to less than the preset blind area signal intensity threshold, locating the mobile terminal and acquiring the current location information of the mobile terminal; and judging whether a location information record which is same as or similar to the current location information of the mobile terminal exists in the blind area list, and if the location information record which is same as or similar to the current location information of the mobile terminal does not exist in the blind area list, taking the current location information of the mobile terminal as new blind area boundary point location information to be stored in the blind area list; wherein the similarity or sameness of two location information refers to that: a distance between locations corresponding to the two location information is less than or equal to a distance distinction threshold.

The distance distinction threshold can be set according to a coverage range of a base station and a dispersion degree of blind area boundary points.

The wireless signal can be one of Global System for Mobile Communications (GSM) signal, Code Division Multiple Access (CDMA) signal, Wideband Code Division Multiple Access (WCDMA) signal, Time Division-Synchronization Code Division Multiple Access (TD-SCDMA) signal, World Interoperability for Microwave Access (WiMAX) signal, Long Term Evolution (LTE) signal and Wireless Fidelity (WiFi) signal.

The intensity of wireless signal can be measured through signal sensitivity or energy per bit to interference density ratio;

when the intensity of wireless signal is measured through the signal sensitivity, the preset blind area signal intensity threshold can be set as −105 dbm; and when the intensity of wireless signal is measured through the energy per bit to interference density ratio, the preset blind area signal intensity threshold can be set as −15 db.

The first blind area distance threshold can be set in combination with the type of the wireless network; for example, with regard to a CDMA network, a blind area alert distance threshold R1 can be set as 30-50 meters.

The method also includes: deleting the blind area boundary point location information from the blind area list;

the step of deleting the blind area boundary point location information from the blind area list includes:

when detecting that the intensity of wireless signal currently received by the mobile terminal is greater than or equal to the preset blind area signal intensity threshold, and distances between the current location of the mobile terminal and locations of one or more blind area boundary points recorded in the blind area list are less than or equal to a preset second blind area distance threshold, deleting records of blind area boundary points with distances between the blind area boundary points and the current location of the mobile terminal being less than or equal to the preset second blind area distance threshold from the blind area list;

wherein the second blind area distance threshold is less than the first blind area distance threshold;

for example, with regard to the CDMA network, the blind area alert distance threshold R1 can be set as 30-50 meters, a blind area range distance threshold R2 can be set as 5-20 meters, the distance distinction threshold can be set as two times of the second blind area distance threshold, for example, it can be set as 10-40 meters.

For example, with respect to the processing of deleting the blind area boundary point location information from the blind area list, it is assumed that three blind area boundary points are contained in the blind area list, and the second blind area distance threshold is set as 20 meters, and if the intensity of wireless signal currently received by the mobile terminal is greater than or equal to the preset blind area signal intensity threshold, and after the mobile terminal is located, it is calculated that the values of distance L between the current location of the mobile terminal and locations of the three blind area boundary points in the blind area list are: $L_1$=15 meters, $L_2$=25 meters and $L_3$=40 meters, only the $L_1$ is less than the second blind area distance threshold, thus a blind area boundary point location record corresponding to the $L_1$ is deleted from the blind area list.

Locating the mobile terminal includes: locating the mobile terminal through a Global Positioning System (GPS) module, or locating the mobile terminal through a WiFi positioning module, or locating the mobile terminal through a base station positioning module, or locating the mobile terminal through a network-assisted GPS module, or locating the mobile terminal through other positioning modules not completely dependent on the current locating ways of the wireless network. Alternatively, the GPS module is selected to locate the mobile terminal.

The current location information of the mobile terminal includes: geographic location coordinates of the mobile terminal, such as latitude and longitude coordinates in which the mobile terminal is located;

in step S10, before locating the mobile terminal and acquiring the current location information of the mobile terminal, the method also includes: judging whether a signal blind area advance prompt function is enabled in the mobile terminal, if the signal blind area advance prompt function is enabled, locating the mobile terminal and acquiring the current location information of the mobile terminal;

in step S30, the prompt of approaching the signal blind area sent to the user can be any one or more than one combination of the following prompt ways: vibration prompt, sound prompt, indicator light prompt and text prompt and so on.

Figure 2:
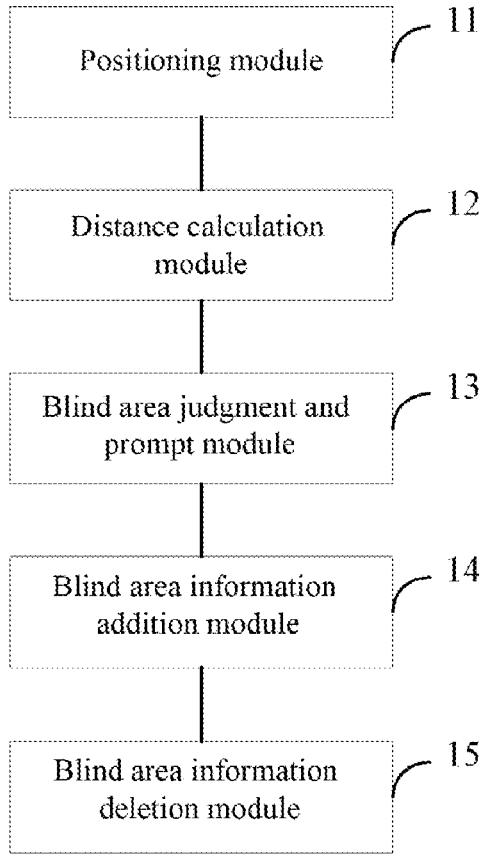
FIG. 2 is a structural schematic diagram of a system for prompting a signal blind area in advance according to the embodiment of the present invention.

As shown in FIG. 2, the embodiment of the present invention provides a system for prompting a signal blind area in advance, which is applied to a mobile terminal. The system includes:

a positioning module 11, configured to: locate the mobile terminal, and acquire the current location information of the mobile terminal;

a distance calculation module 12, configured to: determine distances between the current location of the mobile terminal and locations of various blind area boundary points recorded in a blind area list; and a blind area judgment and prompt module 13, configured to: when one or more of the distances are less than or equal to a preset first blind area distance threshold, send a prompt of approaching the signal blind area to a user.

The system includes the following characteristics:

the system also includes a blind area information addition module 14, configured to: add blind area boundary point location information in the blind area list;

the blind area information addition module 14 includes: a detection unit and an information addition unit;

the detection unit is configured to: detect whether the intensity of wireless signal received by the mobile terminal hops from greater than or equal to a preset blind area signal intensity threshold to less than the preset blind area signal intensity threshold, if the intensity of wireless signal received by the mobile terminal hops from greater than or equal to the preset blind area signal intensity threshold to less than the preset blind area signal intensity threshold, locate the mobile terminal and acquire the current location information of the mobile terminal, and start the information addition unit; and the information addition unit is configured to: judge whether a location information record which is same as or similar to the current location information of the mobile terminal exists in the blind area list, and if the location information record which is same as or similar to the current location information of the mobile terminal does not exist in the blind area list, take the current location information of the mobile terminal as new blind area boundary point location information to be stored in the blind area list; wherein the similarity or sameness of two location information refers to that: a distance between locations corresponding to the two location information is less than or equal to a distance distinction threshold.

The system also includes a blind area information deletion module 15, configured to: delete the blind area boundary point location information from the blind area list;

the blind area information deletion module 15 includes: a detection unit and an information deletion unit;

the detection unit is configured to: when detecting that the intensity of wireless signal currently received by the mobile terminal is greater than or equal to the preset blind area signal intensity threshold, and distances between the current location of the mobile terminal and locations of one or more blind area boundary points recorded in the blind area list are less than or equal to a preset second blind area distance threshold, start the information deletion unit; and the information deletion unit is configured to: delete records of blind area boundary points with distances between the blind area boundary points and the current location of the mobile terminal being less than or equal to the preset second blind area distance threshold from the blind area list; wherein the second blind area distance threshold is less than the first blind area distance threshold.

The positioning module 11 is also configured to: before locating the mobile terminal and acquiring the current location information of the mobile terminal, judge whether a signal blind area advance prompt function is enabled in the mobile terminal, if the signal blind area advance prompt function is enabled, locate the mobile terminal and acquire the current location information of the mobile terminal.

The current location information of the mobile terminal includes: latitude and longitude coordinates in which the mobile terminal is located.

A method and system for prompting the signal blind area in advance provided in the above embodiments are applied to the mobile terminal, and it is to judge whether the mobile terminal has been in a blind area alert zone according to the distances between the current location of the mobile terminal and the locations of signal blind area boundary points, if the mobile terminal has been in the blind area alert zone, a prompt of approaching the signal blind area is sent to the user, which can prompt the user in advance that the mobile terminal is to enter the blind area before the mobile terminal enters the network coverage blind area, thereby improving the user experience.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above embodiments also can be implemented by using one or multiple integrated circuits. Correspondingly, each module/unit in the above embodiments can be implemented in a form of hardware, and also can be implemented in a form of software function module. The embodiments of the present invention are not limited to any combination of hardware and software in a specific form.

It should be noted that the present document can still have other various embodiments, the skilled familiar to the art can make various corresponding changes and transformations according to the embodiments of the present invention without departing from the spirit and essence of the present document, and these corresponding changes and transformations shall all fall into the protection scope of the appended claims of the present document.

INDUSTRIAL APPLICABILITY

In the embodiments of the present invention, it can prompt the user in advance that the mobile terminal is to enter the blind area before the mobile terminal enters the network coverage blind area, which improves the user experience.

What is claimed is:

1. A method for prompting a signal blind area in advance, applied to a mobile terminal, comprising:
    locating the mobile terminal, and acquiring current location information of the mobile terminal;
    determining distances between a current location of the mobile terminal and locations of various blind area boundary points recorded in a blind area list; and
    when one or more of the distances are less than or equal to a preset first blind area distance threshold, sending a prompt of approaching the signal blind area to a user;
    the method further comprising: deleting blind area boundary point location information from the blind area list; wherein
    the step of deleting the blind area boundary point location information from the blind area list comprises:
    when detecting that intensity of a wireless signal currently received by the mobile terminal is greater than or equal to a preset blind area signal intensity threshold, and distances between the current location of the mobile terminal and locations of one or more blind area boundary points recorded in the blind area list are less than or equal to a preset second blind area distance threshold, deleting records of blind area boundary points with distances between the blind area boundary points and the current location of the mobile terminal being less than or equal to the preset second blind area distance threshold from the blind area list;
    wherein the second blind area distance threshold is less than the first blind area distance threshold.

2. The method according to claim 1, further comprising: adding blind area boundary point location information in the blind area list; wherein
    the step of adding blind area boundary point location information in the blind area list comprises:
    detecting whether intensity of a wireless signal received by the mobile terminal hops from greater than or equal to a preset blind area signal intensity threshold to less than the preset blind area signal intensity threshold, when the intensity of the wireless signal received by the mobile terminal hops from greater than or equal to the preset blind area signal intensity threshold to less than the preset blind area signal intensity threshold, locating the mobile terminal and acquiring the current location information of the mobile terminal; and
    judging whether a location information record which is same as or similar to the current location information of the mobile terminal exists in the blind area list, and when the location information record which is same as or similar to the current location information of the mobile terminal does not exist in the blind area list, taking the current location information of the mobile terminal as new blind area boundary point location information to be stored in the blind area list; wherein similarity or sameness of two location information refers to that: a distance between locations corresponding to the two location information is less than or equal to a distance distinction threshold.

3. The method according to claim 2, further comprising: before locating the mobile terminal and acquiring the current location information of the mobile terminal, judging whether a signal blind area advance prompt function is enabled in the mobile terminal, when the signal blind area advance prompt function is enabled, locating the mobile terminal, and acquiring the current location information of the mobile terminal.

4. The method according to claim 2, wherein:
    the current location information of the mobile terminal comprises: latitude and longitude coordinates in which the mobile terminal is located.

5. The method according to claim 1, further comprising: before locating the mobile terminal and acquiring the current location information of the mobile terminal, judging whether a signal blind area advance prompt function is enabled in the mobile terminal, when the signal blind area advance prompt function is enabled, locating the mobile terminal, and acquiring the current location information of the mobile terminal.

6. The method according to claim 1, wherein:
the current location information of the mobile terminal comprises: latitude and longitude coordinates in which the mobile terminal is located.

7. A system for prompting a signal blind area in advance, applied to a mobile terminal, comprising:
a positioning module, configured to: locate the mobile terminal and acquire current location information of the mobile terminal;
a distance calculation module, configured to: determine distances between a current location of the mobile terminal and locations of various blind area boundary points recorded in a blind area list; and
a blind area judgment and prompt module, configured to: when one or more of the distances are less than or equal to a preset first blind area distance threshold, send a prompt of approaching the signal blind area to a user;
the system further comprising a blind area information deletion module, wherein:
the blind area information deletion module is configured to: delete blind area boundary point location information from the blind area list;
the blind area information deletion module comprises: a detection unit and an information deletion unit;
the detection unit is configured to: when detecting that intensity of a wireless signal currently received by the mobile terminal is greater than or equal to a preset blind area signal intensity threshold, and distances between the current location of the mobile terminal and locations of one or more blind area boundary points recorded in the blind area list are less than or equal to a preset second blind area distance threshold, start the information deletion unit; and
the information deletion unit is configured to: delete records of blind area boundary points with distances between the blind area boundary points and the current location of the mobile terminal being less than or equal to the preset second blind area distance threshold from the blind area list;
wherein the second blind area distance threshold is less than the first blind area distance threshold.

8. The system according to claim 7, further comprising a blind area information addition module, wherein:
the blind area information addition module is configured to: add blind area boundary point location information in the blind area list;
the blind area information addition module comprises: a detection unit and an information addition unit;
the detection unit is configured to: detect whether intensity of a wireless signal received by the mobile terminal hops from greater than or equal to a preset blind area signal intensity threshold to less than the preset blind area signal intensity threshold, and when the intensity of the wireless signal received by the mobile terminal hops from greater than or equal to the preset blind area signal intensity threshold to less than the preset blind area signal intensity threshold, locate the mobile terminal and acquire the current location information of the mobile terminal, and start the information addition unit; and
the information addition unit is configured to: judge whether a location information record which is same as or similar to the current location information of the mobile terminal exists in the blind area list, and when the location information record which is same as or similar to the current location information of the mobile terminal does not exist in the blind area list, take the current location information of the mobile terminal as new blind area boundary point location information to be stored in the blind area list; wherein similarity or sameness of two location information refers to that: a distance between locations corresponding to the two location information is less than or equal to a distance distinction threshold.

9. The system according to claim 8, wherein:
the positioning module is further configured to: before locating the mobile terminal and acquiring the current location information of the mobile terminal, judge whether a signal blind area advance prompt function is enabled in the mobile terminal, when the signal blind area advance prompt function is enabled, locate the mobile terminal and acquire the current location information of the mobile terminal.

10. The system according to claim 8, wherein:
the current location information of the mobile terminal comprises: latitude and longitude coordinates in which the mobile terminal is located.

11. The system according to claim 7, wherein:
the positioning module is further configured to: before locating the mobile terminal and acquiring the current location information of the mobile terminal, judge whether a signal blind area advance prompt function is enabled in the mobile terminal, when the signal blind area advance prompt function is enabled, locate the mobile terminal and acquire the current location information of the mobile terminal.

12. The system according to claim 7, wherein:
the current location information of the mobile terminal comprises: latitude and longitude coordinates in which the mobile terminal is located.

* * * * *